United States Patent
Zhang et al.

(10) Patent No.: US 9,978,149 B1
(45) Date of Patent: May 22, 2018

(54) SYSTEM AND METHOD FOR DOOR DETECTION FOR CORRIDOR EXPLORATION

(71) Applicant: HRL Laboratories, LLC, Malibu, CA (US)

(72) Inventors: Lei Zhang, Torrance, CA (US);
Kyungnam Kim, Oak Park, CA (US);
Deepak Khosla, Camarillo, CA (US)

(73) Assignee: HRL Laboratories, LLC, Malibu, CA (US)

( * ) Notice: Subject to any disclaimer, the term of this patent is extended or adjusted under 35 U.S.C. 154(b) by 94 days.

(21) Appl. No.: 14/981,131

(22) Filed: Dec. 28, 2015

Related U.S. Application Data

(60) Provisional application No. 62/150,029, filed on Apr. 20, 2015.

(51) Int. Cl.
*G06T 7/00* (2017.01)

(52) U.S. Cl.
CPC .......... *G06T 7/0044* (2013.01); *G06T 7/0061* (2013.01); *G06T 7/0085* (2013.01); *G06T 2207/10016* (2013.01); *G06T 2207/20021* (2013.01); *G06T 2207/20024* (2013.01); *G06T 2207/30252* (2013.01)

(58) Field of Classification Search
None
See application file for complete search history.

(56) References Cited

U.S. PATENT DOCUMENTS

| | | | | |
|---|---|---|---|---|
| 5,051,906 A | * | 9/1991 | Evans, Jr. | G01S 5/16 180/169 |
| 8,666,158 B2 | * | 3/2014 | Strassenburg-Kleciak | G06K 9/00624 345/419 |
| 9,251,417 B1 | * | 2/2016 | Xu | G06K 9/00208 |
| 2014/0104437 A1 | * | 4/2014 | Chao | H04N 17/002 348/187 |

(Continued)

OTHER PUBLICATIONS

Chen et al., "Visual Detection of Lintel-Occluded Doors from a Single Image," IEEE Computer Vision and Pattern Recognition Workshops, 2008.*

(Continued)

*Primary Examiner* — Matthew Bella
*Assistant Examiner* — Soo Shin
(74) *Attorney, Agent, or Firm* — Tope-McKay & Associates

(57) ABSTRACT

Described is a system for door detection for use with an unmanned aerial vehicle (UAV). The system receive a video input image from a single monocular camera. Edge points are detected in the video, with the edge points connected to form long edge lines. Orientations of the long edge lines are determined, such that long edge lines having a substantially vertical orientation are designated as initial door line candidates and long edge lines having a non-vertical, non-horizontal orientation are designated for use in detecting a vanishing point. A vanishing point is then detected in the video frame. Thereafter, intensity profile and line properties of the door line candidates are calculated. Finally, it is verified if the door line candidates are real world door lines and, if so, an area between the real world door lines is designated as an open door.

21 Claims, 4 Drawing Sheets

(56) References Cited

U.S. PATENT DOCUMENTS

| | | | | |
|---|---|---|---|---|
| 2014/0153773 A1* | 6/2014 | Gupta | ............ | G06K 9/6202 382/103 |
| 2015/0304650 A1* | 10/2015 | Baba | ............ | H04N 17/002 348/148 |
| 2016/0371983 A1* | 12/2016 | Ronning | ............ | G08G 1/168 |

OTHER PUBLICATIONS

Rous et al., "Vision-Based Indoor Scene Analysis for Natural Landmark Detection," Proceedings of the 2005 IEEE International Conference on Robotics and Automation, Barcelona, Spain, Apr. 2005.*
Wei et al., "An Approach to Navigation for the Humanoid Robot Nao in Domestic Environments," In 14th Towards Autonomous Robotic Systems (TAROS-13), Oxford, U.K., In press 2013. Springer Berlin Heidelberg.*
X. Yang and Y. Tian. (2010). Robust Door Detection in Unfamiliar Environments by Combining Edge and Corner Features. Proceedings of the 3rd Workshop on Computer Vision Applications for the Visually Impaired (CVAVI), pp. 57-64.
W. Shi. and J. Samarabandu. (2006). Investigating the performance of corridor and door detection algorithms in different environments. In Int. Conf. on Information and Automation, pp. 206-211.
A. C. Murillo, J. Košecká, J. J. Guerrero, and C. Sagüés. (2008). Visual door detection integrating appearance and shape cues. Robot. Auton. Syst. 56, 6 (Jun. 2008), pp. 512-521.
R. Munoz-Salinas, E. Aguirre, M. Garcia-Silvente, and A. Gonzalez. (2004). Door-detection using computer vision and fuzzy logic. In Proceedings of the 6th World Scientific and Engineering Academy and Society (WSEAS) International Conference on Mathematical Methods & Computational Techniques in Electrical Engineering, pp. 1-6.
F. Mahmood and F. Kunwar. (2013). A Self-Organizing Neural Scheme for Door Detection in Different Environments. CoRR abs/1301.0432, pp. 13-18.
R. Sekkal, F. Pasteau, M. Babel, B. Brun, I. Leplumey (2013). Simple monocular door detection and tracking. International Conference on Image Processing: pp. 3929-3933.
R. Grompone von Gioi, J. Jakubowicz, J.-M. Morel, G. Randall. (2012). LSD: a Line Segment Detector. Image Processing on Line, pp. 35-55.

P. Bouthemy (1989). A maximum likelihood framework for determining moving edges, IEEE Transactions on Pattern Analysis and Machine Intelligence, vol. 11, No. 5, pp. 499-511.
Intel Corporation (2014), "Intel® NUC with Intel® vPro™ Technology (DC53427HYE)", http://www.intel.com/content/www/usien/nuc/overview.html . Downloaded Oct. 19, 2016.
DJI F550 GPS Drone, http://www.helipal.com/dji-flamewheel-f550-w-naza-v2-gps-drone-rtf.html. Downloaded Oct. 19, 2016.
The Robot Operating System (ROS), http://www.ros.org/about-ros/. Downloaded Oct. 19, 2016.
ASUSTeK Computer Inc., Xtion PRO, http://www.asus.com/Multimedia/Xtion_PRO/ . Downloaded Oct. 19, 2016.
IDS Imaging Development Systems, "uEye USB2 industrial camera", http://en.ids-imaging.com/store/produkte/kameras/usb-2-0-kameras.html. Downloaded Oct. 19, 2016.
Matrix Vision, "USB 2.0 single-board camera with housing—mvBlueFOX-IGC", http://www.matrix-vision.com/USB2.0-single-board-camera-with-housing-mvbluefox-igc.html . Downloaded Oct. 19, 2016.
Parrot AR.Drone 2.0, http://ardrone2.parrot.com/ downloaded on Jan. 27, 2016.
Yang, X. & Tian, Y. (2010). Robust Door Detection in Unfamiliar Environments by Combining Edge and Corner Features. Proceedings of the 3rd Workshop on Computer Vision Applications for the Visually Impaired (CVAVI).
Jens Hensler, Michael Blaich, and Oliver Bittel, Real-Time Door Detection Based on AdaBoost Learning Algorithm, Eurobot Conference, vol. 82 of Communications in Computer and Information Science, pp. 61-73. Springer. (2009).
Jung-Suk Lee, Nakju Lett Doh, Wan Kyun Chung, Bum-Jae You, and Youngil Youm, "Door Detection Algorithm of Mobile Robot in Hallway using PC-camera", International Symposium on Automation and Robotics in Construction, 2004.
Canny, J., A Computational Approach to Edge Detection, IEEE Trans. Pattern Analysis and Machine Intelligence, 8(6): pp. 679-698, 1986.
H. Samet and M. Tamminen (1988). "Efficient Component Labeling of Images of Arbitrary Dimension Represented by Linear Bintrees". IEEE Transactions on Pattern Analysis and Machine Intelligence (TIEEE Trans. Pattern Anal. Mach. Intell.) 10: pp. 579-586.
R. Brunelli, Template Matching Techniques in Computer Vision: Theory and Practice, Wiley, section 3.5 "Pattern Variability and the Normalized Correlation Coefficient." ISBN 978-0-470-51706-2, 2009, pp. 57-61.

* cited by examiner

SYSTEM AND METHOD FOR DOOR DETECTION FOR CORRIDOR EXPLORATION

GOVERNMENT RIGHTS

This invention was made with government support under U.S. Government Contract Number W31P4Q-08-C-0264 CT2WS Phase 3. The government has certain rights in the invention.

CROSS-REFERENCE TO RELATED APPLICATIONS

This is a non-provisional patent application of U.S. Provisional Application No. 62/150,029, filed on Apr. 20, 2015, the entirety of which is hereby incorporated by reference.

BACKGROUND OF INVENTION

(1) Field of Invention

The present invention generally relates to autonomous unmanned aerial vehicles (UAVs) and, more specifically, to a system for efficient door detection for corridor exploration with a UAV.

(2) Description of Related Art

The application of unmanned aerial vehicles (UAVs) has been a very hot research topic in both academy and industry. This is probably because of their wide applicability to different tasks such as autonomous information collection, military monitoring, surveillance, rescue searching, etc. and the expensive costs of human operators. Perception is one of the key capabilities for any autonomous UAV. Without perception, autonomous navigation and task planning and execution are almost impossible. Nevertheless, perception for any machine or robot is notorious challenging because of limited information that can be processed in real-time and large variations in natural environments such as illumination change and background change.

UAVs need perception capabilities to guide them to autonomously navigate through the environment and do path planning as tasks require. In the scenario of flying through corridors inside a building, door detection becomes a fundamental perception task for a UAV so that it can recognize the possible entrance of a room and plan its motion ahead. UAVs usually have very resource-limited onboard processing capabilities. This fact restrains UAVs from using computationally intensive algorithms for such fundamental tasks as door detection.

Attempts have been made by others for door detection; however, all of such prior art works suffer from a variety of deficiencies. For example, the prior work of Yang et al. requires detecting door corners (see the List of Incorporated Literature References, Reference No. 2). Alternatively, the works of Hensler et al. and Lee et al. need both a camera and a two-dimensional (2D) laser range finder (see Literature References Nos. 3 and 4). The work Hensler et al. also requires detecting door knobs and frames as additional information for finding the door. The work of Murillo et al. depends on not only shape information but also appearance information, which is not reliable because doors may have quite different appearances (see Literature Reference No. 5).

Thus, a continuing need exists for a robust and computationally efficient door detection system that does not require depth information and is independent of door appearances and parts.

SUMMARY OF INVENTION

Disclosed is a system for door detection. In one embodiment, the system includes one or more processors and a memory, the memory being a non-transitory computer-readable medium having executable instructions encoded thereon, such that upon execution of the instructions, the one or more processors perform several operations, including: receiving a video input image, the video input image having at least one video frame; detecting edge points in the video frame; connecting the edge points to form long edge lines; determining orientations of the long edge lines, such that long edge lines having a substantially vertical orientation are designated as initial door line candidates and long edge lines having a non-vertical, non-horizontal orientation are designated for use in detecting a vanishing point; determining if a vanishing point in the video frame is detectable. If a vanishing point is detected, the system further performs operations of calculating intensity profile and line properties of the door line candidates; and verifying if the door line candidates are real world door lines and, if so, then designating an area between the real world door lines as an open door.

In another aspect, in determining if a vanishing point in the video frame is detectable, if a vanishing point is not detected, the system performs an operation of comparing the door line candidates against a template of previously detected door lines to verify if the door line candidates are real world door lines.

In yet another aspect, the system performs an operation of temporally filtering door line candidates previously verified as real world door lines.

Additionally, in detecting edge points in the video frame, a Canny edge detector detects edge pixels whose intensity gradient is within a preselected range, with said edge pixels being designated as edge points.

In another aspect, in connecting the edge points to form long edge lines, gradient directions at all edge pixels are calculated and discretized into N number of bins, such that edge pixels with gradient orientations belonging to a same bin are linked to form a long edge line.

In yet another aspect, in detecting a vanishing point, the system performs operations several operations, such as filtering detected long edge lines to remove long edge lines that are horizontal leaving remaining long edge lines. Horizontal edge lines will correspond, for example, to a door or window or wall at the end of the corridor facing the camera. These lines are removed (if slope is close to zero in the horizontal direction). Remaining lines survive. The system then splits the video frame into an M×M grid having a plurality of grid cells within the video frame. The system continues by calculating intersections of the remaining long edge lines such that a number of line intersections within each grid cell is calculated; designating a cell with a maximum number of line intersections as containing the vanishing point; and calculating a centroid of the line intersections within the designated cell as the vanishing point.

Additionally, in verifying if the door line candidates are real world door lines, the system performs operations of: determining a distance from the vanishing point to a door line candidate, such that if the distance is less than a predetermined threshold, the door line candidate is filtered out from further processing, leaving remaining door line candidates; pairing each remaining door line candidate with one another to form candidate doors formed by a pair of door line candidates, and determining a distance between each pair of door line candidates such that if the distance is outside of a predetermined threshold, the candidate door formed by the pair of door line candidates is filtered out as a candidate door from further processing, and if the distance is within a predetermined threshold, the candidate door formed by the pair of door line candidates maintains designation as a candidate door for further processing and the corresponding pair of door line candidates are designated are remaining pairs of door lines; designating three areas in the image frame around the remaining pair of door lines, with a first part at a left of the candidate door, a second part encompassing an area within the candidate door, and a third part at a right of the candidate door; and calculating an intensity profile for the three parts and comparing the intensity profile against a prior knowledge to filter out remaining pairs of door lines that fall outside a predetermined range, with at least one remaining pair of door lines that fall within the predetermined range being designated as real world door lines with the area between the real world door lines being designated as an open door.

In yet another aspect, the system is embedded in a mobile platform (e.g., unmanned aerial vehicle, such as a drone) and the memory includes instructions for causing the one or more processors to perform an operation of actuating motors within the mobile platform to cause the mobile platform to navigate between the real world door lines of the open door.

Finally, this disclosure also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
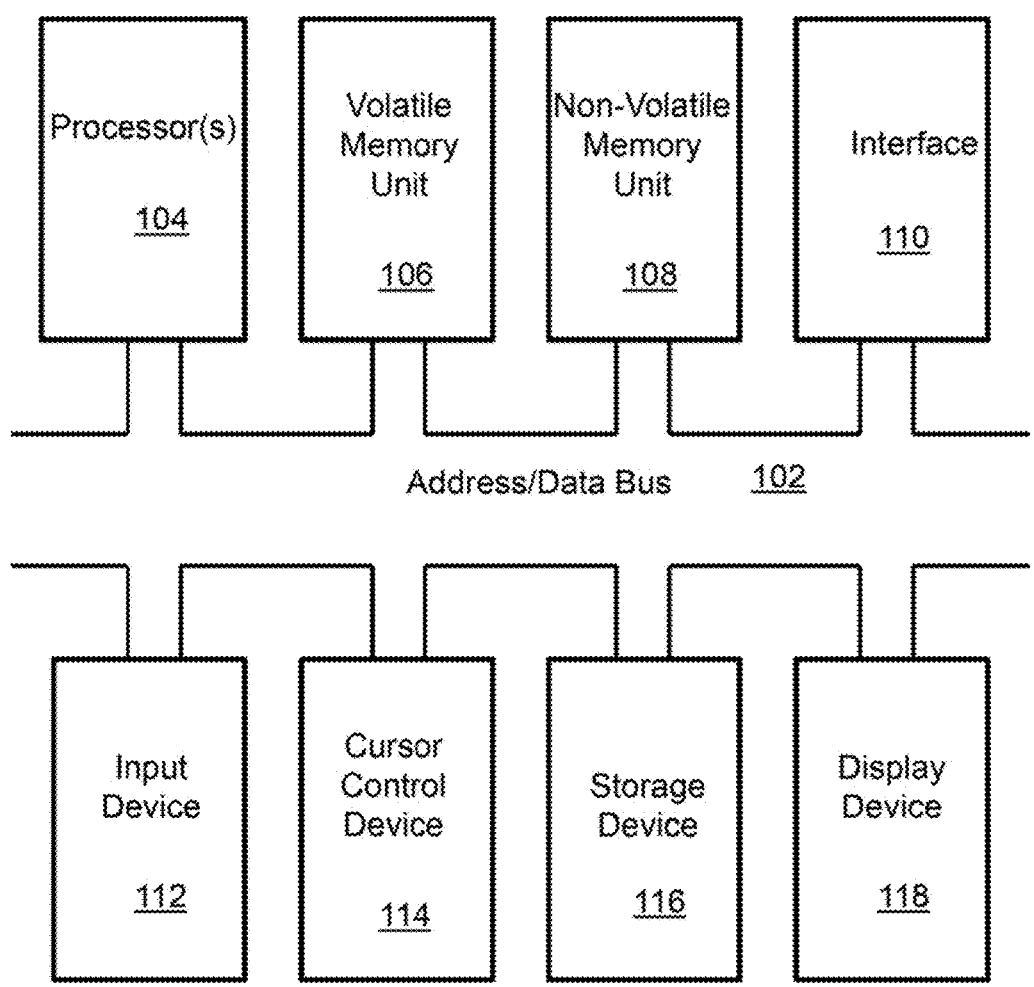
FIG. 1 is a block diagram depicting the components of a system according to an embodiment.

The present invention generally relates to autonomous unmanned aerial vehicles (UAVs) and, more specifically, to a system for efficient door detection for corridor exploration with a UAV. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number.

1. Parrot AR.Drone 2.0, http://ardrone2.parrot.com/, taken on Apr. 20, 2015.
2. Yang, X. & Tian, Y. (2010). Robust Door Detection in Unfamiliar Environments by Combining Edge and Corner Features. Proceedings of the 3rd Workshop on Computer Vision Applications for the Visually Impaired (CVAVI).
3. Jens Hensler, Michael Blaich, and Oliver Bittel. Real-Time Door Detection Based on AdaBoost Learning Algorithm. Eurobot Conference, volume 82 of Communications in Computer and Information Science, page 61-73. Springer, (2009).
4. Jung-Suk Lee, Nakju Lett Doh, Wan Kyun Chung, Bum-Jae You, and Youngil Youm, "Door Detection Algorithm of Mobile Robot in Hallway using PC-camera", International Symposium on Automation and Robotics in Construction, 2004.
5. A. C. Murillo, J. Košecki, J. J. Guerrero, and C. Sagüés. 2008. Visual door detection integrating appearance and shape cues. Robot. Auton. Syst. 56, 6 (June 2008), 512-521.

6. Canny, J., A Computational Approach To Edge Detection, IEEE Trans. Pattern Analysis and Machine Intelligence, 8(6):679-698, 1986.
7. H. Samet and M. Tamminen (1988). "Efficient Component Labeling of Images of Arbitrary Dimension Represented by Linear Bintrees". IEEE Transactions on Pattern Analysis and Machine Intelligence (TIEEE Trans. Pattern Anal. Mach. Intell.) 10: 579.
8. R. Brunelli, Template Matching Techniques in Computer Vision: Theory and Practice, Wiley, ISBN 978-0-470-51706-2, 2009.

(2) Principal Aspects

The present invention has three "principal" aspects. The first is a system for efficient door detection. The system is typically in the form of a computer system operating software or in the form of a "hard-coded" instruction set. This system may be incorporated into a wide variety of devices that provide different functionalities. For example, the system can be incorporated into an unmanned aerial vehicle having a single monocular camera for corridor exploration. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
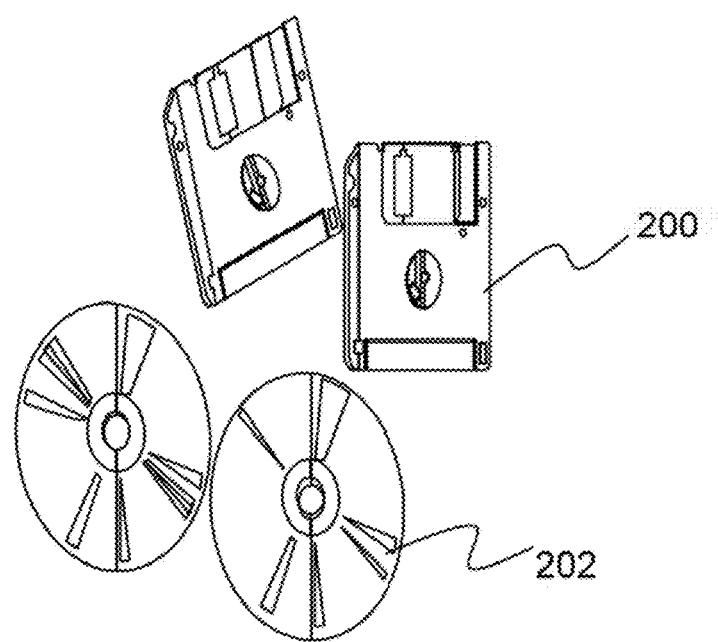
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

The application of unmanned aerial vehicles (UAVs) has been a very hot research topic in both academy and industry, largely due to their wide applicability to different tasks such as autonomous information collection, military monitoring, surveillance, rescue searching, etc. and the expensive costs of human operators. Perception is one of the key capabilities for any autonomous UAV. Without perception, autonomous navigation and task planning and execution are almost impossible. Nevertheless, perception for any machine or robot is notorious challenging because of limited information that can be processed in real-time and large variations in natural environments such as illumination change and background change. Thus, the invention described herein is directed to an efficient system for door detection along corridors (e.g., within a building or other location) to provide perception capability in a UAV to help the UAV autonomously fly through the corridor.

As noted above, described herein is an efficient system that detects doors along corridors using a single monocular camera as an input sensor. Aimed at being used in computational resource limited platforms for UAVs, the system is characterized by its computationally simplified yet effective processing that can be easily implemented on any suitable mobile platform, a non-limiting example of which includes the quad-rotor AR.Drone2.0 as described in Literature Reference No. 1. It should be understood that although the system is described with respect to a UAV platform, the system is not intended to be limited thereto as it can also be implemented on any mobile platform, including ground based robots or vehicles.

The system first uses a Canny edge detector and edge linking with connected component analysis to detect long edges in each video frame. Note that the process is directed to detecting straight lines. If Canny edge detector provides a curve, it is desirable to filter out the curved lines. For example, the curved lines can be fit to a straight line through linear least squares fitting, such as by y=mx+c (see linear least squares fitting, http://mathworld.wolfram.com/Least-SquaresFitting.html) and when the fit correlation is poor (e.g., <0.7), the lines are rejected. Once the long edges are detected, it then calculates the vanishing point (VP) using near horizontal edges. The near vertical edges are initial door line candidates and are verified by their edge properties (e.g., length, location, distance) and an intensity profile with respect to their surrounding areas. In addition, a template matching based approach is used as an optional process to detect door lines when no vanishing point is detected for the current frame. Finally, the detected door lines can be processed by a temporal filter to smooth out noisy detection. In a single-threaded implementation, this system can easily process, for example, about 10 frames per second without specific optimization on a regular laptop (e.g., using an Ubuntu Linux system). Several unique aspects include: 1) combining an edge-based door detection with a template-matching based door detection; 2) general enough to deal with varying scenarios (e.g., illumination change, view angle change, door color change); 3) using vanishing point to guide verifying door line candidates; and 4) simple and efficient implementation that easily fits into UAV platforms.

The system as described herein is different from the prior art in several aspects. First, it only uses a single monocular camera as input, without requiring depth information. Second, it is based on the edge information and does not depend on the appearance of a door. It also does not require detecting of door parts such as door knobs and door frames. Third, it leverages prior information about the orientation of door lines and the intensity profile of the door compared to its surrounding areas. Fourth, it does not require complex computation and especially fits for resource-limited UAV platform. Fifth, it does not require a training stage and no training data is required. Sixth, it can work under different illumination conditions and/or view angles in the corridors. Thus and as can be appreciated by those skilled in the art, the system described herein provides an improved process for door detection that can be implemented on a variety of platforms, non-limiting examples of which include UAV surveillance applications, autonomous driving, driver alert/situational awareness, autonomous ground robot navigation, area exploration, and UAVs as used for human/property rescue from disasters. For further understanding, specific details of the system are provided below.

(4) Specific Details of the Invention

Figure 3:
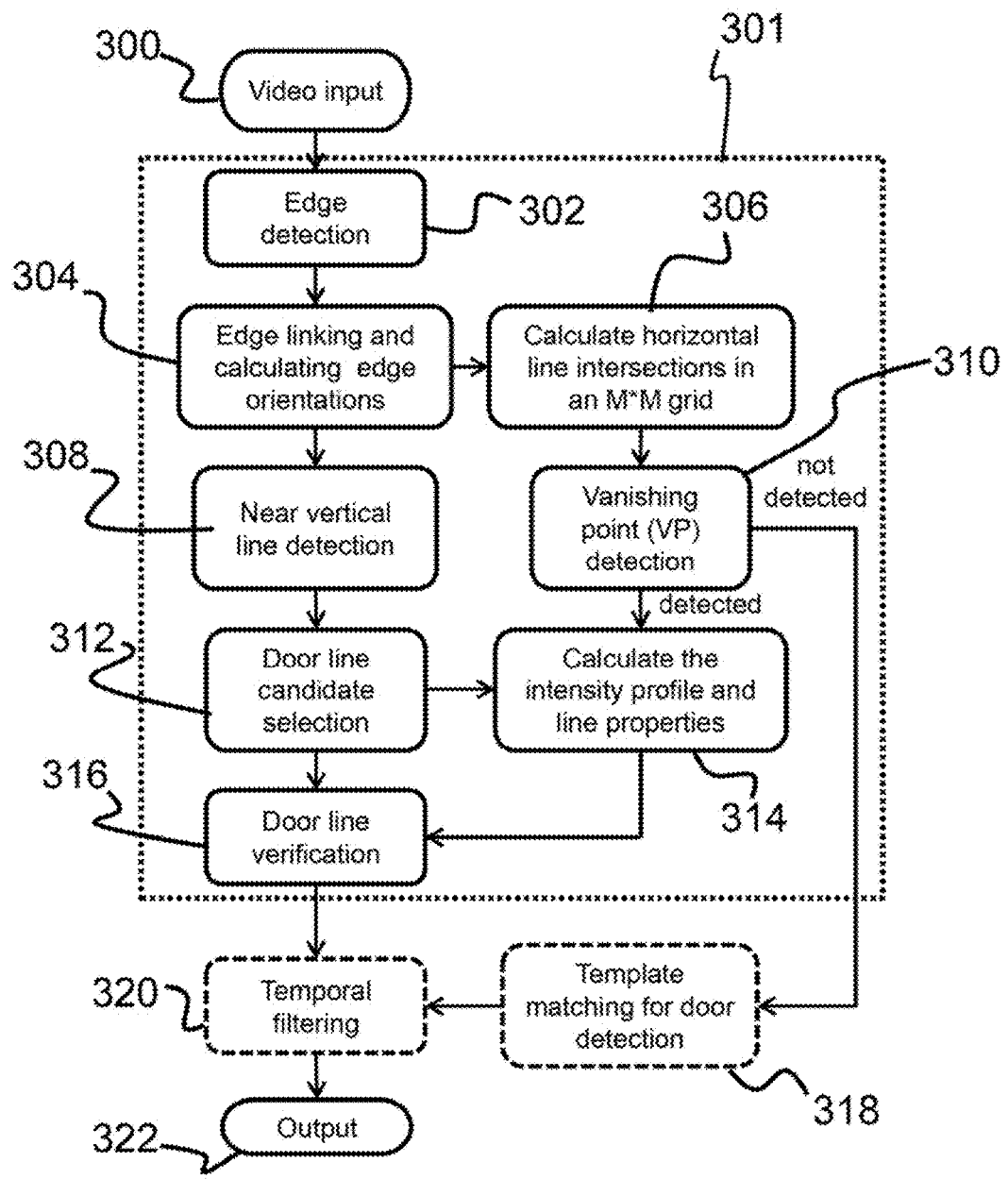
FIG. 3 is a system block diagram for door detection along corridors using a single monocular camera.

As shown in FIG. 3, the system includes several processes to achieve the goal of detecting doors. The input of the system is a video 300 captured by a single monocular camera embedded on the mobile platform (e.g., unmanned aerial vehicle, such as a drone). Given the video input 300, an edge detection 302 process is first applied on each frame to detect edge points. In the next step 304, the detected edge points or edge fragments are then connected to become a fully linked edge (i.e., long edge lines) through edge linking using connected component analysis (see Literature Reference No. 7 for a description of connected component analysis process). The orientations of the edges (i.e., long edge lines) are then calculated. The edges close to horizontal orientation are used to calculate the vanishing point along the corridor (i.e., calculate horizontal line intersections on an M×M grid 306), while the edges close to vertical orientation (i.e., near vertical line detection 308) are the initial candidates for door lines. Then, the vanishing point is detected 310 by using edges intersecting most near the central area of the image. In near vertical line detection 308, an edge is considered close (near) to a vertical orientation if its orientation is within a small degree, e.g., 10 degree, from the vertical axis. Such edges are then designated as door line candidates 312.

If the vanishing point is available (i.e., is detected), the process continues by calculating the intensity profile and line properties 314 of the door line candidates 312. In doing so, the door line candidates 312 are verified 316 (as described in further detail below) by their geometric properties and the intensity profile with respect to their adjacent areas to detect the actual doors. As an optional process, if no vanishing point is detected, a template matching 318 based approach is used to detect door lines that look similar as the recently detected door's boundary. The door lines detected by both processes can be finally filtered by a temporal filter 320 to eliminate noisy detection and designate a door boundary. The output 322 of the system is the detected door lines (door boundary) along the corridor, which may be used by an autonomous UAV (or other mobile platform), for example, to guide it to explore the indoor building by itself. The system can then be used cause the UAV to navigate between the detected door lines. In other words, in operation, the system can then provide instructions to cause the motors and/or other actuators in the UAV to navigate the UAV through the detected doorway. Further details regarding these processes are provided below.

(4.1) Edge Detection

As noted above, the system employs an edge detection 302 process to detect edge points in the input video 300. In one example setup, a monocular camera embedded on the UAV takes a video of the environment and streams it to a laptop through wireless network. Given each frame in the streaming video, an edge detector is used to detect possible edge pixels whose intensity gradient is within a preselected range. Any suitable edge detector can be utilized, a non-limiting example of which includes a Canny edge detector as described in Literature Reference No. 6.

In addition, non-maximum suppression is used within the detector to retain only thin lines (i.e., edge candidates). The gradient directions at all edge pixels are calculated and discretized into N number of bins. Edge pixels with gradient orientations belonging to the same bin are linked using connected component analysis (see Literature Reference No. 7 for a description of connected component analysis process). In this way, small pieces of edge pixels are connected to form longer lines. Each line's orientation is calculated and stored as the line's geometric features together with its two end points and its length. These line features are used later for door detection.

(4.2) Vanishing Point Detection

As noted above, the system employs a vanishing point detection 310 process. A vanishing point is the point where corridor non-horizontal, non-vertical lines, when extended, intersect on the image frame. In other words, near-vertical lines go to door detection and non-horizontal lines go to vanishing point detection. For example, the only lines to omit from the vanishing point determination are the vertical and horizontal lines. Each remaining line can be described by y=mx+b. Finding the intersection of lines i and j means finding coordinates where $m_i x+b_i=m_j x+b_j$, solve for $x_{ij}$, then $y_{ij}$, and continuing the process for all combinations of i and j.

The vanishing point is often used to guide the UAV's moving direction. To detect the vanishing point in each frame, the previously detected edge lines are first filtered to remove lines that are too close to horizontal (left→right) direction. The intersections of remaining lines are then calculated. The entire image area is split into an M×M grid and the number of line intersections within each grid cell is calculated. The cell with the maximum number of line intersections contains the vanishing point. This is because in the corridor scenario there are many lines parallel to the corridor floor and they mostly intersect at the far end of the corridor.

The centroid of those intersections within the chosen cell is used as the detected vanishing point location. In addition, a probability score for the vanishing point is calculated based on the number of intersections in the selected cell and the variance of their image locations using a polynomial regression function. The detected vanishing point is directly used to control the navigation of the UAV along the corridor and is also used as additional information for helping door detection, which is discussed in the next section.

(4.3) Edge Based Door Detection

In edge detection based door detection 301, doors are detected 302 based on the edges in each frame. In the corridor flying scenario, the UAV is usually hovering or flying along the corridor. Under this example scenario, the doors are basically along the vertical direction in each frame. Door edges are vertical only if the UAV is flying horizontal and is stabilized. If the UAV is tilted or banking then the camera is tilted and so are the edges in the image. Thus, in some embodiments, it is assumed that a vertical door is when the UAV is self-stabilized, non-tilting with the monocular camera mounted to have one image axis parallel to the horizontal axis. However, in some embodiments, to adjust for such variations in motion of the UAV, the roll and pitch of the UAV are known from onboard sensors. The image edges can be transformed to a zero roll-zero pitch coordinate system. Door edges therefore become vertical. Alternatively a gimbal-mounted camera can adjust its orientation based on the UAV roll-pitch to have an effective zero roll-zero pitch of the camera image.

Using this prior knowledge, the edges are first selected that are close to the vertical direction, allowing a small deviation of ±α (e.g., 10) degree. In addition, the candidates are also filtered according to their lengths and locations of the lower end points. In typical flying situations, the end of the corridor is usually close to the image center. For simplicity, doors are separately detected on the left side and right side of the corridor. When detecting doors on the left side, only edges on the left portion (up to λ %, e.g., λ=20 to 35) of the image are considered, similarly for the right side.

Figure 4:
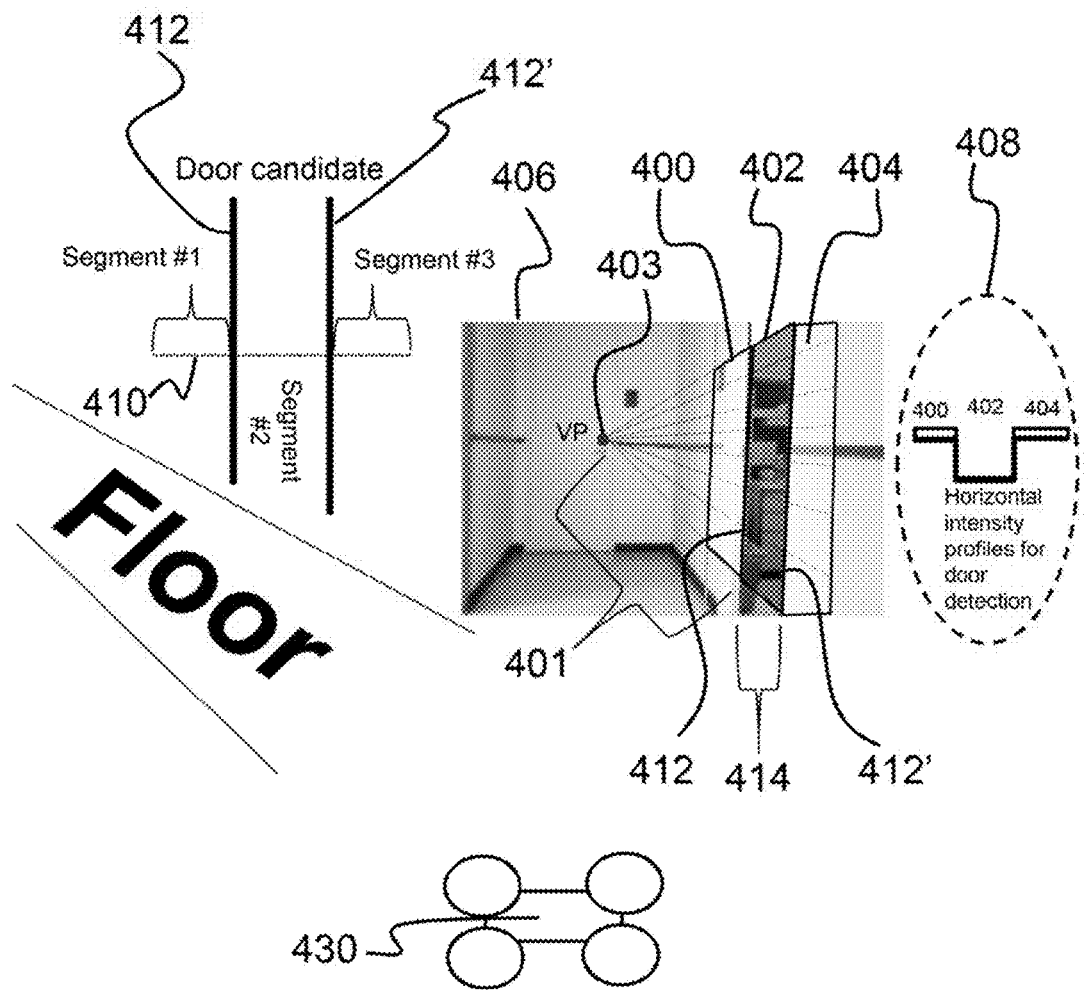
FIG. 4 is an illustration depicting a process for calculating an intensity profile at adjacent areas of a candidate door.

The initially filtered vertical edges are further merged to connect short broken edges to longer lines. In edge linking and edge orientation 304, only edges with very similar distances to the left middle point of the image and similar edge orientations are merged (to detect vertical lines 308). This process generates longer vertical lines that may better represent the candidates of door lines (door line candidate selection 312). These candidate lines are further verified 316 by a series of filtering processes to detect the true door (real world door) that is closest to the UAV on each side of the corridor. As follows:

1. First, if the candidate line intersects the top or bottom of the image but the intersection (i.e., the intersection with the horizontal lines extending from the vanishing point) is outside of the image, it is filtered out and is no longer a valid candidate.
2. Second and as shown in FIG. 4, the distance 401 from the vanishing point (VP) 403 to the door line candidate 412 is calculated. If the door line 412 is too close to the vanishing point 403, it cannot belong to a door that is close to the UAV. Such a candidate line is filtered out. A door line is considered too close to the vanishing point 403 if the distance is less than a predetermined amount, such as less than 1/8 the image width.

3. Third, each candidate line 412 is paired with another candidate line 412' to form a candidate door. If the distance 414 between the pair of lines (i.e., the candidate door's width) is too big or too small compared to a typical door's width, this candidate door is invalid. For example, the distance 414 between the pair of lines (e.g., 412 and 412') is determined to be too big or too small if the distance is greater than a predetermined amount (e.g., 1/4 the image width) or if the distance is smaller than a predetermined amount (e.g., 1/16 the image width).

4. Fourth and as show in FIG. 4, the image area around the pair of door lines is split into three parts: the portion to the left of the door 400, the door 402, and the portion to the right of the door 404. In other words and as shown, the image frame 406 is split into the three parts 400, 402, and 404. An intensity profile 408 is then calculated (depicted as element 314 in FIG. 3) for these parts. As illustrated, a horizontal line 410 is crossed over the door lines and the pixels along the horizontal line 410 are used to calculate the intensity profile. Basically, the horizontal line 410 is split into three segments (corresponding to the three parts in the image) by the pair of door lines 412 and 412'. The mean and variance of intensities within each segment are calculated. And the candidate pair of door lines 412 and 412' is filtered according to their intensity profile and the prior knowledge of the corridor. For example, in a normal situation, if the door is open, its mean intensity is often lower than the other two parts because the wall usually has white color. In addition, the intensity variance within an open door area is often larger than the other two parts because of the cluttered objects in an office. This filtering process can be adjusted for different scenarios because the prior knowledge may change.

5. The above process as outlined in Step Four is repeatedly performed at multiple vertical locations along the door line candidates 412 and 412'. The number of iterations that pass the intensity profile filtering is accumulated. If the total number is above a predefined percentage (e.g., 50%), the pair of door lines 412 and 412' are declared as valid (i.e., real world door lines) and a door (i.e., open door) is found.

In one example, the system detects only one door at each side of the corridor, which usually corresponds to the door closest to the UAV. However, the above process can be applied iteratively to find more than one door in each side of the corridor. If an open door is found, the system can be activated to actuate motors within an mobile platform 430 to cause the mobile platform 430 to navigate between the real world door lines (i.e., 412 and 412') of the open door.

(4.4) Template Matching for Door Detection

The aforementioned edge-based door detection method needs the vanishing point 403 and therefore can only be applied when a vanishing point 403 is successfully detected. In real practice there could be cases that no vanishing point is successfully detected. Under such situations, the system employs supplementary approaches to detect the doors. For example, a template matching method can be utilized for this purpose. Once the vanishing point 403 and a door are successfully detected, the system extracts the image patch around the door's boundary as a template and stores such templates in a buffer. This buffer is online updated and automatically clears old templates when a number (e.g., 5 or any desired number) of frames pass. When a new door is detected, its template is added into the buffer.

When no vanishing point is detected, the latest template in the buffer is used to compare with the new image frame so as to find a possible matched image patch. This is achieved using a standard template matching approach based on normalized correlation. See Literature Reference No. 8 for a further description of a template matching approach based on normalized correlation. If the matching score is above a predefined threshold (e.g., 0.95 (maximum 1)), a door line that looks very similar to the previously detected door line is detected using this template matching method. The previously detected door line is thus shifted to the new location as the new door line.

The above template matching method usually can approximately find the new location of a recently detected door line. However, the template buffer size should be carefully controlled because template matching may fail when the actual door is already too far from the previously detected location. When no door is detected for a long enough period, such as after 10-20 frames, the template buffer will become empty and no template matching can be applied.

(4.5) Temporal Filtering of Detected Doors

The door detection generated by all processes discussed above can still be noisy, considering the large variations and cluttering of the testing scenarios. To reduce false alarms, the system uses temporal filtering (depicted as element 320 in FIG. 3) to ensure the detections are temporally consistent. This process filters out certain sporadic detection that contradicts to the fact that a door should be continuously detected within a few flames, assuming the smooth motion in a physical world. The filtering process basically checks if a door is continuously detected in each frame within a predetermined temporal window. If the door is detected in most of the frames within this window (e.g., 4 out of 5 frames), the door is a valid detection; otherwise, the door is filtered out. Although not required by the system described herein, temporal filtering is an optional process that can be added into the system for refining the door detection.

While this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for door detection, the system comprising:
   one or more processors and a memory, the memory being a non-transitory computer-readable medium having executable instructions encoded thereon, such that upon execution of the instructions, the one or more processors perform operations of:

receiving a video input image, the video input image having at least one video frame;

detecting edge points in the video frame;

connecting the edge points to form long edge lines;

determining orientations of the long edge lines, such that long edge lines having a substantially vertical orientation are designated as initial door line candidates and long edge lines having a non-vertical, non-horizontal orientation are designated for use in detecting a vanishing point;

determining if a vanishing point in the video frame is detectable, such that if a vanishing point is detected, the system performs operations of:

calculating intensity profile and line properties of the door line candidates; and verifying if the door line candidates are real world door lines based on the intensity profile and line properties and, if so, then designating an area between the real world door lines as an open door; and wherein in determining if a vanishing point in the video frame is detectable, if a vanishing point is not detected, the system performs an operation of comparing the door line candidates against a template of previously detected door lines to verify if the door line candidates are real world door lines.

2. The system as set forth in claim 1, further performing an operation of temporally filtering door line candidates previously verified as real world door lines.

3. The system as set forth in claim 1, wherein in detecting edge points in the video frame, a Canny edge detector detects edge pixels whose intensity gradient is within a preselected range, with said edge pixels being designated as edge points.

4. The system as set forth in claim 1, wherein connecting the edge points to form long edge lines, gradient directions at all edge pixels are calculated and discretized into N number of bins, such that edge pixels with gradient orientations belonging to a same bin are linked to form a long edge line.

5. The system as set forth in claim 1, wherein in detecting a vanishing point, the system performs operations of:

filtering detected long edge lines to remove long edge lines that are horizontal leaving remaining long edge lines;

splitting the video frame into an M×M grid having a plurality of grid cells within the video frame;

calculating intersections of the remaining long edge lines such that a number of line intersections within each grid cell is calculated;

designating a cell with a maximum number of line intersections as containing the vanishing point; and calculating a centroid of the line intersections within the designated cell as the vanishing point.

6. The system as set forth in claim 1, wherein verifying if the door line candidates are real world door lines, the system performs operations of:

determining a distance from the vanishing point to a door line candidate, such that if the distance is less than a predetermined threshold, the door line candidate is filtered out from further processing, leaving remaining door line candidates;

pairing each remaining door line candidate with one another to form candidate doors formed by a pair of door line candidates, and determining a distance between each pair of door line candidates such that if the distance is outside of a predetermined threshold, the candidate door formed by the pair of door line candidates is filtered out as a candidate door from further processing, and if the distance is within a predetermined threshold, the candidate door formed by the pair of door line candidates maintains designation as a candidate door for further processing and the corresponding pair of door line candidates are designated are remaining pairs of door lines;

designating three areas in the image frame around the remaining pair of door lines, with a first part at a left of the candidate door, a second part encompassing an area within the candidate door, and a third part at a right of the candidate door;

calculating an intensity profile for the three parts and comparing the intensity profile against a prior knowledge to filter out remaining pairs of door lines that fall outside a predetermined range, with at least one remaining pair of door lines that fall within the predetermined range being designated as real world door lines.

7. The system as set forth in claim 1, wherein the system is embedded in a mobile platform and further comprising instructions for causing the one or more processors to perform an operation of actuating motors within the mobile platform to cause the mobile platform to navigate between the real world door lines.

8. A computer implemented method for door detection, the method comprising an act of causing one or more processors to execute instructions encoded on a non-transitory computer readable medium, such that upon execution of the instructions, the one or more processors perform operations of:

receiving a video input image, the video input image having at least one video frame;

detecting edge points in the video frame;

connecting the edge points to form long edge lines;

determining orientations of the long edge lines, such that long edge lines having a substantially vertical orientation are designated as initial door line candidates and long edge lines having a non-vertical, non-horizontal orientation are designated for use in detecting a vanishing point;

determining if a vanishing point in the video frame is detectable, such that if a vanishing point is detected, the system performs operations of:

calculating intensity profile and line properties of the door line candidates; and verifying if the door line candidates are real world door lines based on the intensity profile and line properties and, if so, then designating an area between the real world door lines as an open door; and wherein in determining if a vanishing point in the video frame is detectable, if a vanishing point is not detected, comparing the door line candidates against a template of previously detected door lines to verify if the door line candidates are real world door lines.

9. The computer implemented method as set forth in claim 8, further comprising an act of temporally filtering door line candidates previously verified as real world door lines.

10. The computer implemented method as set forth in claim 8, wherein in detecting edge points in the video frame, a Canny edge detector detects edge pixels whose intensity gradient is within a preselected range, with said edge pixels being designated as edge points.

11. The computer implemented method as set forth in claim 8, wherein connecting the edge points to form long edge lines, gradient directions at all edge pixels are calculated and discretized into N number of bins, such that edge pixels with gradient orientations belonging to a same bin are linked to form a long edge line.

12. The computer implemented method as set forth in claim 8, wherein in detecting a vanishing point, further comprises acts of:
    filtering detected long edge lines to remove long edge lines that are horizontal leaving remaining long edge lines;
    splitting the video frame into an M×M grid having a plurality of grid cells within the video frame;
    calculating intersections of the remaining long edge lines such that a number of line intersections within each grid cell is calculated;
    designating a cell with a maximum number of line intersections as containing the vanishing point; and
    calculating a centroid of the line intersections within the designated cell as the vanishing point.

13. The computer implemented method as set forth in claim 8, wherein verifying if the door line candidates are real world door lines, further comprises acts of:
    determining a distance from the vanishing point to a door line candidate, such that if the distance is less than a predetermined threshold, the door line candidate is filtered out from further processing, leaving remaining door line candidates;
    pairing each remaining door line candidate with one another to form candidate doors formed by a pair of door line candidates, and determining a distance between each pair of door line candidates such that if the distance is outside of a predetermined threshold, the candidate door formed by the pair of door line candidates is filtered out as a candidate door from further processing, and if the distance is within a predetermined threshold, the candidate door formed by the pair of door line candidates maintains designation as a candidate door for further processing and the corresponding pair of door line candidates are designated are remaining pairs of door lines;
    designating three areas in the image frame around the remaining pair of door lines, with a first part at a left of the candidate door, a second part encompassing an area within the candidate door, and a third part at a right of the candidate door;
    calculating an intensity profile for the three parts and comparing the intensity profile against a prior knowledge to filter out remaining pairs of door lines that fall outside a predetermined range, with at least one remaining pair of door lines that fall within the predetermined range being designated as real world door lines.

14. The computer implemented method as set forth in claim 8, further comprising an act of causing the one or more processors to perform an operation of actuating motors within a mobile platform to cause the mobile platform to navigate between the real world door lines.

15. A computer program product for door detection, the computer program product comprising:
    a non-transitory computer-readable medium having executable instructions encoded thereon, such that upon execution of the instructions by one or more processors, the one or more processors perform operations of:
        receiving a video input image, the video input image having at least one video frame;
        detecting edge points in the video frame;
        connecting the edge points to form long edge lines;
        determining orientations of the long edge lines, such that long edge lines having a substantially vertical orientation are designated as initial door line candidates and long edge lines having a non-vertical, non-horizontal orientation are designated for use in detecting a vanishing point;
        determining if a vanishing point in the video frame is detectable, such that if a vanishing point is detected, the system performs operations of:
            calculating intensity profile and line properties of the door line candidates; and
            verifying if the door line candidates are real world door lines based on the intensity profile and line properties and, if so, then designating an area between the real world door lines as an open door; and
        wherein in determining if a vanishing point in the video frame is detectable, if a vanishing point is not detected, comparing the door line candidates against a template of previously detected door lines to verify if the door line candidates are real world door lines.

16. The computer program product as set forth in claim 15, further performing an operation of temporally filtering door line candidates previously verified as real world door lines.

17. The computer program product as set forth in claim 15, wherein in detecting edge points in the video frame, a Canny edge detector detects edge pixels whose intensity gradient is within a preselected range, with said edge pixels being designated as edge points.

18. The computer program product as set forth in claim 15, wherein connecting the edge points to form long edge lines, gradient directions at all edge pixels are calculated and discretized into N number of bins, such that edge pixels with gradient orientations belonging to a same bin are linked to form a long edge line.

19. The computer program product as set forth in claim 15, wherein detecting a vanishing point, the computer program product further comprises instructions for causing the one or more processors to perform operations of:
    filtering detected long edge lines to remove long edge lines that are horizontal leaving remaining long edge lines;
    splitting the video frame into an M×M grid having a plurality of grid cells within the video frame;
    calculating intersections of the remaining long edge lines such that a number of line intersections within each grid cell is calculated;
    designating a cell with a maximum number of line intersections as containing the vanishing point; and
    calculating a centroid of the line intersections within the designated cell as the vanishing point.

20. The computer program product as set forth in claim 15, wherein verifying if the door line candidates are real world door lines, the computer program product further comprises instructions for causing the one or more processors to perform operations of:
    determining a distance from the vanishing point to a door line candidate, such that if the distance is less than a predetermined threshold, the door line candidate is filtered out from further processing, leaving remaining door line candidates;
    pairing each remaining door line candidate with one another to form candidate doors formed by a pair of door line candidates, and determining a distance between each pair of door line candidates such that if the distance is outside of a predetermined threshold, the candidate door formed by the pair of door line candidates is filtered out as a candidate door from further processing, and if the distance is within a predetermined threshold, the candidate door formed by the pair of door line candidates maintains designation as a candidate door for further processing and the corresponding pair of door line candidates are designated are remaining pairs of door lines;

designating three areas in the image frame around the remaining pair of door lines, with a first part at a left of the candidate door, a second part encompassing an area within the candidate door, and a third part at a right of the candidate door;

calculating an intensity profile for the three parts and comparing the intensity profile against a prior knowledge to filter out remaining pairs of door lines that fall outside a predetermined range, with at least one remaining pair of door lines that fall within the predetermined range being designated as real world door lines.

21. The computer program product as set forth in claim 15, further comprising instructions for causing the one or more processors to perform an operation of actuating motors within a mobile platform to cause the mobile platform to navigate between the real world door lines.

* * * * *